United States Patent
Uehara et al.

(10) Patent No.: US 9,938,887 B2
(45) Date of Patent: Apr. 10, 2018

(54) COMBUSTION CHAMBER STRUCTURE FOR DIESEL ENGINE

(71) Applicant: Nissan Motor Co., Ltd., Yokohama-Shi, Kanagawa (JP)

(72) Inventors: Isshou Uehara, Kanagawa (JP); Manabu Hasegawa, Kanagawa (JP); Naohide Tsuji, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 30 days.

(21) Appl. No.: 15/310,147

(22) PCT Filed: May 22, 2014

(86) PCT No.: PCT/JP2014/063532
§ 371 (c)(1),
(2) Date: Nov. 10, 2016

(87) PCT Pub. No.: WO2015/177897
PCT Pub. Date: Nov. 26, 2015

(65) Prior Publication Data
US 2017/0145901 A1    May 25, 2017

(51) Int. Cl.
*F02B 23/06* (2006.01)

(52) U.S. Cl.
CPC .................... *F02B 23/06* (2013.01)

(58) Field of Classification Search
CPC .. F02B 23/06; F02B 3/02; F02B 23/00; F02B 23/10; F02D 41/34; F02D 41/08; F02D 41/02
See application file for complete search history.

(56) References Cited

U.S. PATENT DOCUMENTS

| | | |
|---|---|---|
| 5,099,809 A | 3/1992 | Kawatani et al. |
| 2013/0036998 A1 | 2/2013 | Cornwell et al. |

FOREIGN PATENT DOCUMENTS

| | | |
|---|---|---|
| DE | 102006027338 A1 | 12/2007 |
| EP | 1801381 A1 | 6/2007 |
| EP | 2003303 A1 | 12/2008 |
| EP | 2187017 A1 | 5/2010 |
| EP | 2840243 A1 | 2/2015 |
| FR | 2849900 A1 | 7/2004 |
| FR | 2918413 A1 | 1/2009 |
| JP | S6373529 U | 5/1988 |
| JP | 03-32124 U | 3/1991 |
| JP | 2000352316 A | 12/2000 |

(Continued)

*Primary Examiner* — Hieu T Vo
(74) *Attorney, Agent, or Firm* — Young Basile Hanlon & MacFarlane, P.C.

(57) ABSTRACT

A direct injection diesel engine includes a piston having a reentrant cavity and a multi-hole fuel injection nozzle disposed on a center line of the cavity. The cavity is formed by a lip portion defining a smallest diameter at a position below a piston crown surface and a raised portion formed at a center of the bottom and shaped like a frustum of a cone. A conical surface of the raised portion is formed to have an angle pointing to a spray point of the fuel injection nozzle at a piston top dead center position. The height position of a top surface is substantially equal to the height position of the lip portion. This structure is to promote the oxidation of soot by utilizing the air in the central part of the cavity.

4 Claims, 12 Drawing Sheets

(56) References Cited

FOREIGN PATENT DOCUMENTS

| JP | 2004332574 A | * | 11/2004 | ............. | F02D 41/34 |
|----|--------------|---|---------|---------------|------------|
| JP | 2013527360 A |   | 6/2013  |               |            |
| JP | 2013160186 A |   | 8/2013  |               |            |
| WO | 2013154004 A1 |  | 10/2013 |               |            |

* cited by examiner

FIG.14
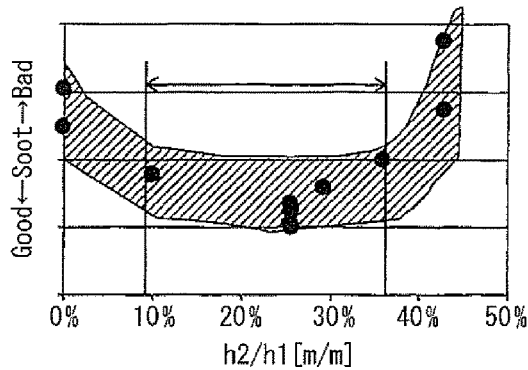
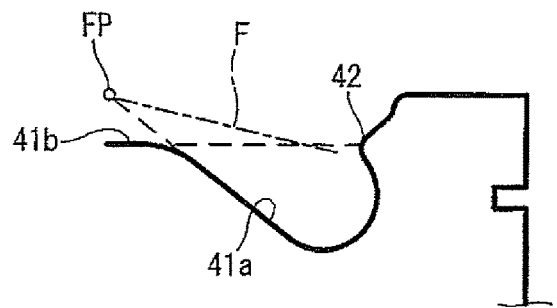
FIG.15
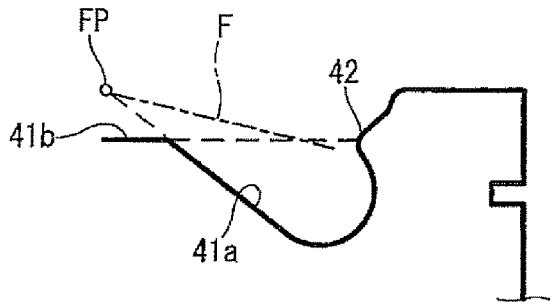
FIG.16
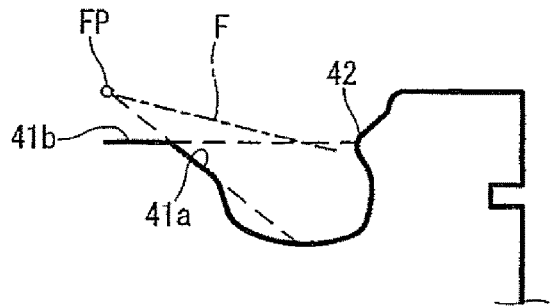
FIG.17

COMBUSTION CHAMBER STRUCTURE FOR DIESEL ENGINE

TECHNICAL FIELD

The present invention relates to a combustion chamber structure for a direct injection diesel engine provided with a reentrant type cavity formed in a piston crown surface, and a multi-hole fuel nozzle or fuel injector disposed on a center line of the cavity.

BACKGROUND

In the direct injection diesel engine, recently, there is a trend to employ a so-called open type reentrant cavity to reduce soot problematical in the high speed, high load region. The open type reentrant cavity has a cavity entrance having a relatively large diameter to improve the air utilization in the squish area.

In the open type reentrant cavity, however, the utilization of air tends to become rather worse in the central portion of the cavity, so that it is not always possible to reduce the soot sufficiently.

The reentrant cavity has an annular space for maintaining swirl. The annular space of the reentrant cavity is defined by a combination of a central raised portion shaped like a circular cone or a frustum of a circular cone, and a peripheral lip portion formed in an entrance portion of the cavity. In the reentrant cavity of earlier technology, the inclination of the conical surface of the central raised portion is relatively gentle as disclosed in JP 2013-527360A. However, the conical surface of such a gentle inclination is not contributive to improvement of the utilization of air in the central region of the cavity.

SUMMARY

In a diesel engine including a piston having a crown surface formed with a reentrant cavity and a multi-hole fuel injection nozzle or fuel injector disposed on a center line of the cavity (6), a combustion chamber structure of the diesel engine according to the present invention is arranged so that a conical surface of a raised portion centered in a bottom of the cavity (6) is inclined to have an angle pointing to a spray point of the fuel injection nozzle at a piston top dead center position, or an angle steeper than the angle pointing to the spray point.

In this structure, the initial generation of soot is suppressed by good mixing of the fuel and air at the bottom of cavity, and the oxidation of soot is promoted by improvement in the utilization of air in the central region of the cavity during diffusion combustion, so that the soot emission is reduced in the high speed high load region. Especially, the raised portion guides the gas ascending from the bottom of the cavity along the conical surface to the central region of the cavity where the amount of remaining air is greater, thereby improves the utilization of air in the central part of the cavity and suppresses the soot emission effectively.

In one of preferred embodiments, a lip or lip portion making the inside diameter smallest in the entrance portion of the cavity is located on a lower side of the opening brim, and the height of the position of the top of the raised portion is set substantially equal to the height of the position of the lip portion.

BRIEF DESCRIPTION OF THE DRAWINGS

FIG. 14 is a characteristic view showing a relation of the soot emission quantity and a height ratio (h2/h1);

FIG. 15 is an illustration view showing the positional relationship between the cavity of the practical example and a spray center axial line F;

FIG. 16 is an illustration view showing a variation example of the raised portion;

FIG. 17 is an illustration view showing another variation example of the raised portion;

DETAILED DESCRIPTION OF THE EMBODIMENTS

Following is detailed explanation on one embodiment of the present invention with reference to the drawings.

Figure 1:
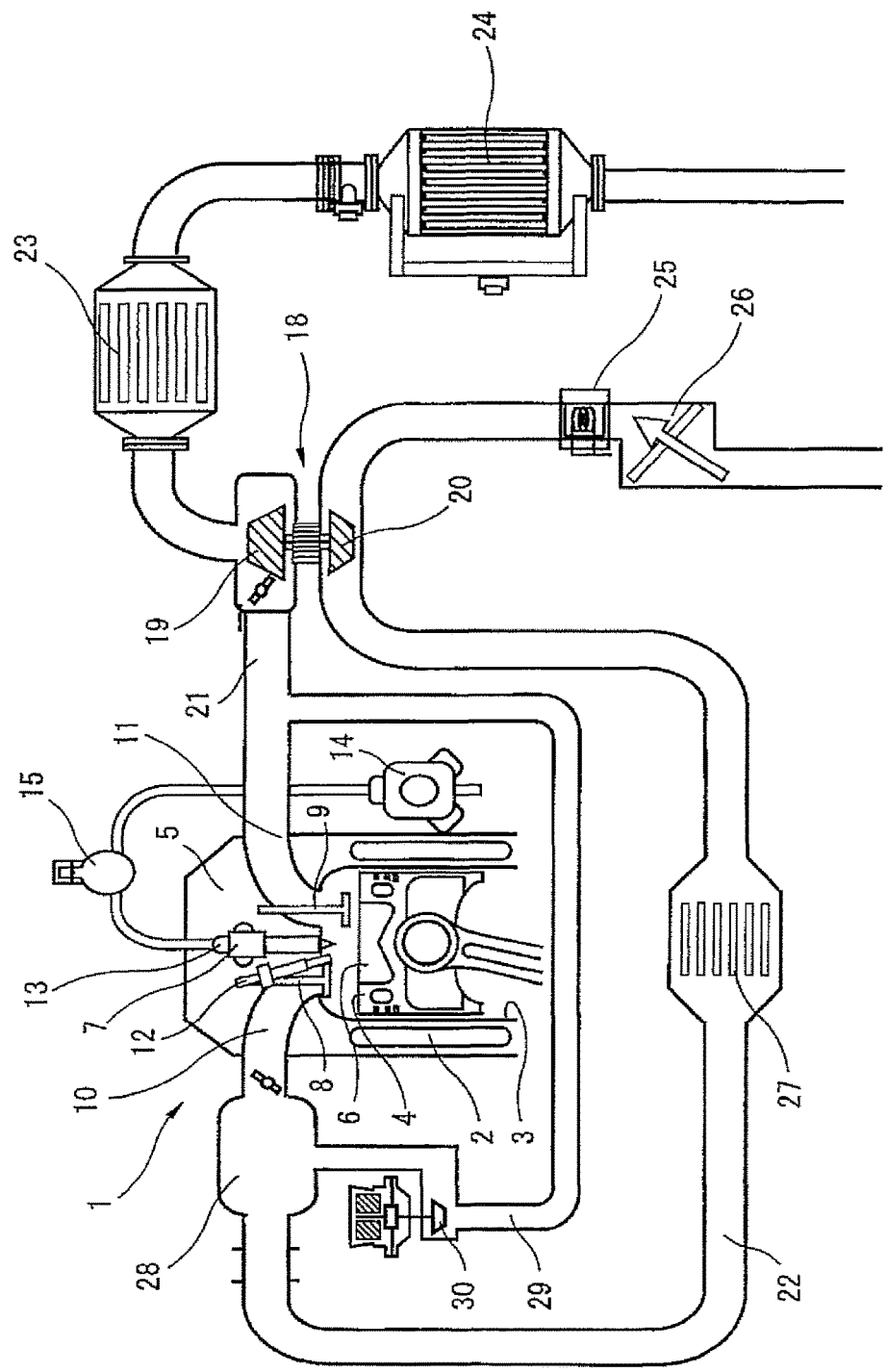
FIG. 1 is a view for illustrating the construction of a diesel engine provided with a combustion chamber structure according to a practical example of the present invention.

FIG. 1 is a view for illustrating the construction of a direct injection type diesel engine 1 according to the present invention, with its intake and exhaust systems. A piston 4 is slidably fit in a cylinder 3 formed in a cylinder block 3, and the upper open end of cylinder 3 is covered by a cylinder head 5 fixed to the upper surface of cylinder block 2.

A reentrant type cavity 6 is formed in the top surface of piston 4, in the form of a recessed portion. This cavity 6 has the shape of a solid of revolution around a center axial line or center axis of piston 4. In other words, the cavity 6 is in the form of a true circle in a plan view of piston 4, and the cavity 6 is formed at the center of piston 4. A multi-hole fuel injection nozzle or injector 7 is disposed, in the cylinder head 5, at the center position of cylinder 3 corresponding to the center of cavity 6. In this practical example of the embodiment, the multi-hole fuel injection nozzle 7 extends vertically along the center axial line of cylinder 3.

A pair of intake valves 8 and a pair of exhaust valves 9 are disposed in cylinder head 5 and arranged to open and close the open ends of respective intake ports 10 and respective exhaust ports 11. The intake valves 10 and exhaust valves 9 are disposed vertically so that the valve stem of each valve extends in parallel to the center axial line of cylinder 3. A glow plug 12 is disposed in cylinder head 5, at a position adjacent to the fuel injection nozzle 7.

The fuel injection nozzle 7 of each cylinder is connected with a common rail 13 schematically shown in the figure, and arranged to lift a needle (not shown) of the fuel injection nozzle 7 in response to a drive signal from an unillustrated engine control unit, and thereby to inject a high pressure fuel supplied into common rail 13 from a high pressure fuel pump 14. The pressure of fuel in common rail 13 is regulated at a predetermined pressure corresponding to an engine operating condition by the engine control unit through a pressure regulating valve 15.

The diesel engine 1 of this practical example is provided with a turbocharger 18 including a turbine 19 disposed in the flow passage of an exhaust passage 21, and a compressor 20 disposed in the flow passage of an intake passage 22. A pre catalytic converter 23 and a main catalytic converter 24 are disposed in series in the exhaust passage 21 on the downstream side of turbine 19. On the upstream side of compressor 20 in intake passage 22, there are provided an air flowmeter 25 and an air cleaner 26. An intercooler 27 is disposed in intake passage 22, between the compressor 20 and a collector portion 28 located on the downstream side of compressor 20. Furthermore, an exhaust gas recirculation system is formed by an exhaust gas recirculation passage 29 extending from an upstream portion of exhaust passage 21 on the upstream side of turbine 19, to the intake collector portion 28 for fluid connection therebetween and an exhaust gas recirculation control valve 30 to control an exhaust gas recirculation rate to a predetermined value corresponding to an engine operating condition.

Figure 2:
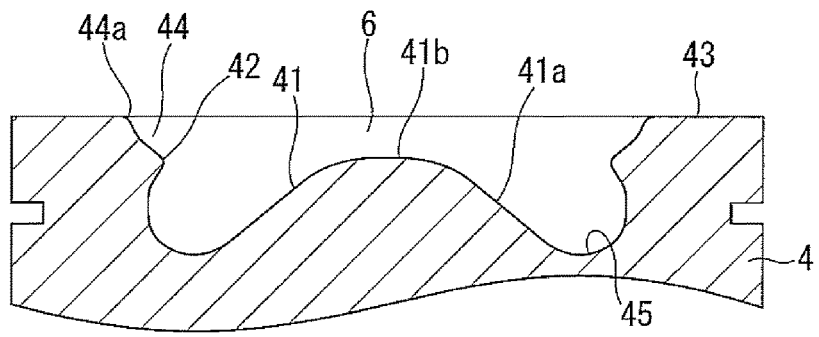
FIG. 2 is a sectional view of a main part of a piston, for showing the geometry of the cavity.

FIG. 2 shows a sectional shape of the cavity 6. This cavity 6 is a reentrant type cavity including a raised portion 41 raised like a mountain at the center of the bottom and a wall making a diameter of the cavity at an entrance portion smaller than a maximum diameter at an intermediate level or height. Specifically, a lip portion 5*b* defining a minimum diameter in the entrance portion is formed at a position lower than a piston crown surface 43 remaining in an annular shape or a shape of a circular ring, in the piston axial direction. A pocket portion 44 is formed on an upper side of the lip 42. The pocket portion 44 is a space enlarged or recess radially outwards. Accordingly, the diameter of an opening edge or brim 44*a* of pocket portion 44 in the piston crown surface 43 is greater than the diameter defined by the lip portion 42. Thus, the cavity is shaped as a so-called open type reentrant cavity designed to improve the air utilization in a squish area (region above the crown surface 43).

On the lower side of lip 42, a curved surface 45 extends curvedly like a circular arc in a section, and continues smoothly to the raised portion 41. Raised portion 41 is shaped approximately in the form of a truncated cone and includes a conical surface 41*a* and a top surface 41*b*. The top surface 41*b* of raised portion 41 is not completely flat, but curved gently.

Figure 3:
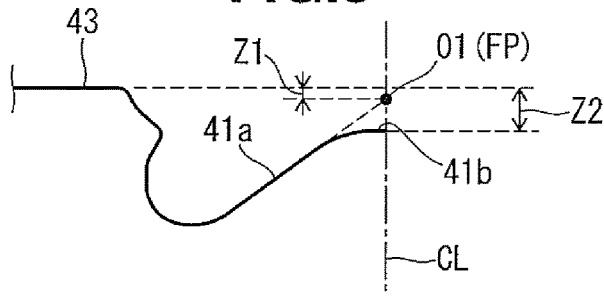
FIG. 3 is an illustration view for defining "slope reach depth Z1" and "depth Z2"

As illustrated in FIG. 3, for use as an index representing the inclination angle of conical surface 41*a*, a distance Z1 is defined as "slope reach depth Z1". The distance Z1 is a distance from the piston crown surface 43, to an intersection point O1 at which an extension line of conical surface 41*a* intersects a piston center line CL of piston 4, and this distance Z1 is defined as "slope reach depth Z1". In this practical example, the slope reach depth Z1 corresponds to the height position of a spray point FP of fuel injection nozzle 7 when piston 4 is located at a top dead center position. The "spray point FP" is defined as a point at which a center line of a spray of each injection hole of fuel injection nozzle 7 intersects a center line of fuel injection nozzle 7. Thus, in this practical example, the conical surface 41*a* has an inclination angle pointing to the spray point FP of fuel injection nozzle 7 at the piston top dead center position.

Moreover, as shown in FIG. 3, a distance Z2 is a distance from the piston crown surface 43 to the center peak or highest point of top surface 41*b*, and this distance Z2 is defined as "depth Z2" of the raised portion 41. In this practical example, this depth Z2 is substantially equal to a distance from the piston crown surface 43 to the lip portion 42 as measured in the axial direction of piston 4. Thus, the height of the peak of raised portion 41 is substantially equal to the height of lip portion 42.

Figure 4:
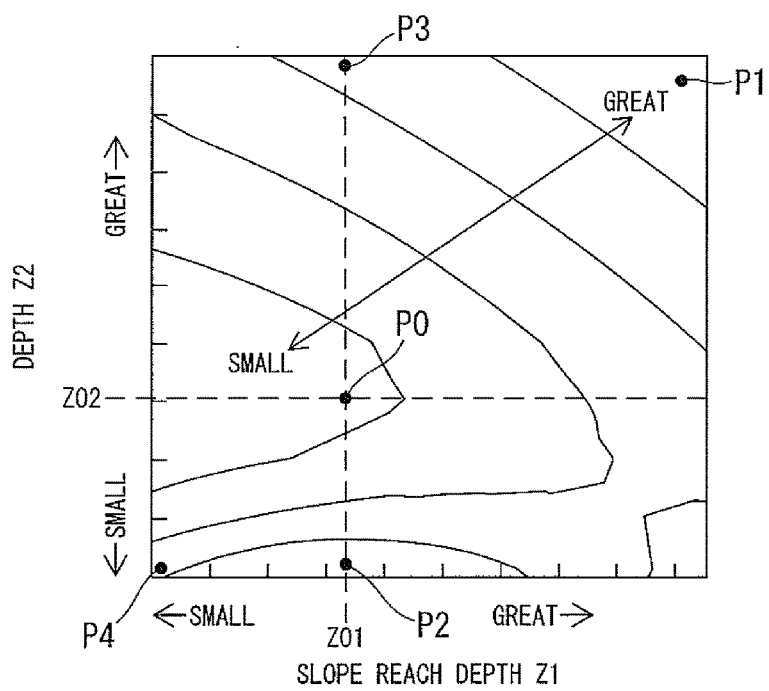
FIG. 4 is a characteristic view showing a relation of the soot emission quantity and the "slope reach depth Z1" and "depth Z2"
Figure 5B:
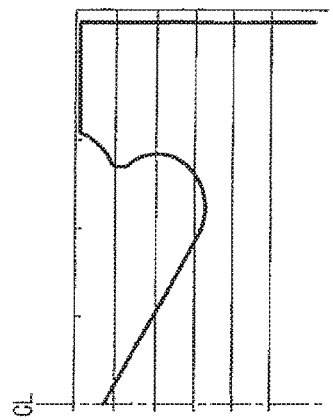
FIG. 5 is a view for illustrating the cavity shapes of comparative examples 1~4.
Figure 5D:
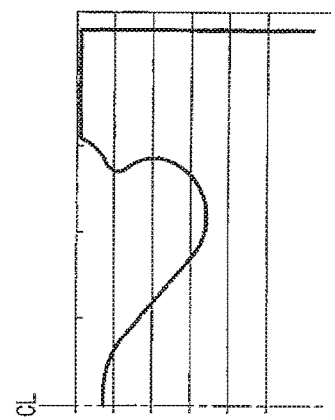
Figure 5A:
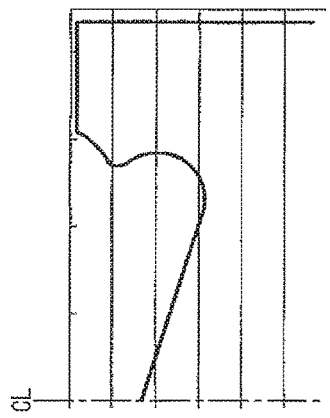
Figure 5C:
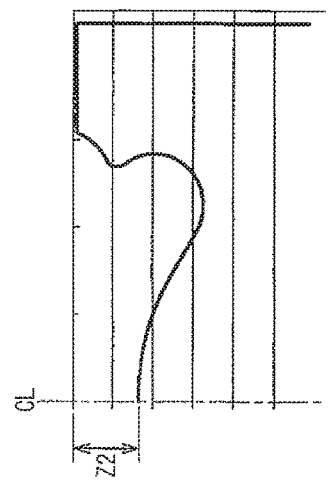

FIG. 4 shows a soot emission quantity in a high speed, high load region, obtained by simulation, with a horizontal axis representing the "slope reach depth Z1" and a vertical axis representing "depth Z2". In other words, FIG. 4 shows the results of simulation for determining the emission quantity of soot in various combustion chamber structures differentiated by changing the shape of the raised portion 41 without changing the shape of the outer circumferential portion or surrounding portion of cavity 6 including lip portion 42. The soot emission quantity is shown in FIG. 4 in the form of a contour map. As a tendency as a whole, the soot emission quantity becomes smaller as the "slope reach depth Z1" becomes smaller, and as to "depth Z2", the soot emission quantity is decreased when the "depth Z2" is at a height position of lip portion 42 (indicated by Z02 in the figure). As evident from the results of the simulation of FIG. 4, the soot emission quantity is at a smallest level when the "slope reach depth Z1" is at the height position of the spray point FP at the piston top dead center (indicated by Z01 in the figure) and simultaneously the "depth Z2" is at the height position Z02 of lip portion 42. As to the "slope reach depth Z1", the soot emission quantity becomes equal to a value of a minimum level when the "slope reach depth Z1" becomes smaller than the height position Z01 of spray point FP. However, in the above-mentioned practical example of the embodiment, the "slope reach depth Z1" is set equal to the height position Z01 of spray point FP because of limitation to avoid interference with fuel injection nozzle 7 at the piston top dead center.

Therefore, the configuration of raised portion 41 in the practical example according to the embodiment is located at a position indicated by P0 in FIG. 4. By contrast, the configurations of comparative examples 1~4 shown at (*a*)~(*d*) in FIG. 5 are located, respectively, at points P1-P4 in FIG. 4, so that the soot emission quantity is relatively great. In the comparative example 1 shown in FIG. 5(*a*), the "slope reach depth Z1" and "depth Z2" are both greater than those of the practical example. In the comparative example 2 shown in FIG. 5(*b*), the "slope reach depth Z1" is equal to that of the practical example and the "depth Z2" is smaller than that of the practical example. In the comparative example 3 shown in FIG. 5(*c*), the "slope reach depth Z1" is equal to that of the practical example and the "depth Z2" is greater than that of the practical example. In the comparative example 4 shown in FIG. 5(*d*), the "slope reach depth Z1" is smaller than that of the practical example and the "depth Z2" is also smaller than that of the practical example.

Figure 6:
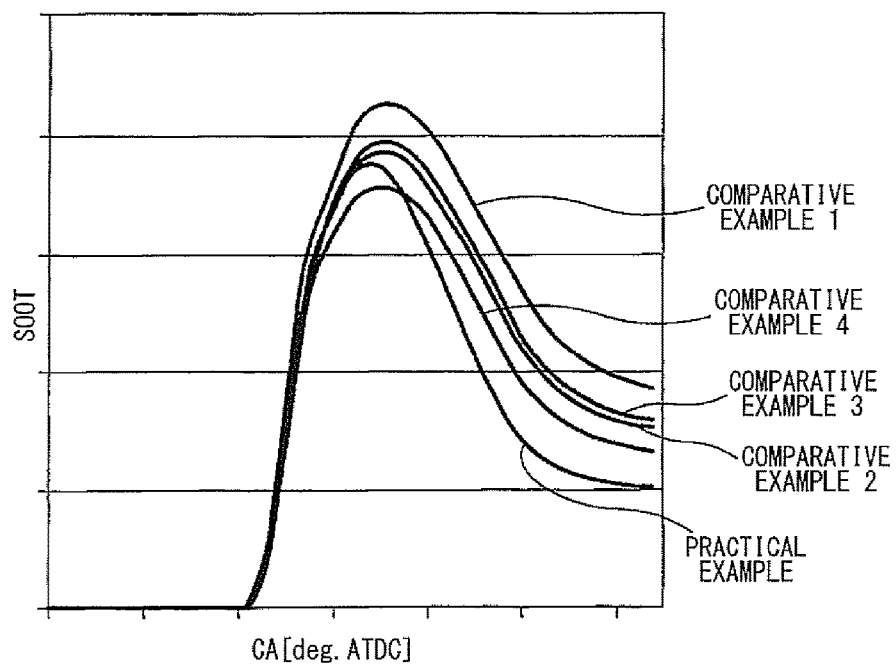
FIG. 6 is a characteristic view showing variation of the quantity of soot during a cycle.
Figure 7A:
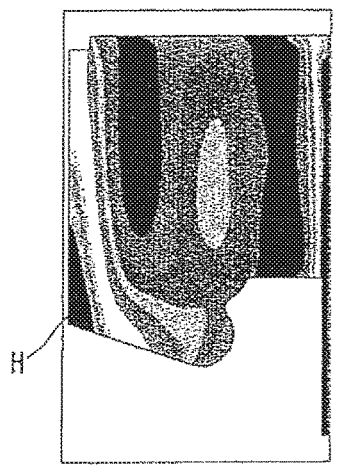
FIG. 7 is a view showing incylinder distributions of equivalent ratio at a predetermined crank angle.
Figure 7B:
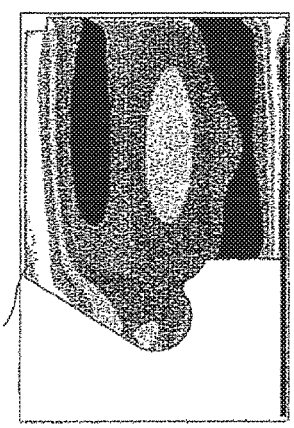
Figure 7C:
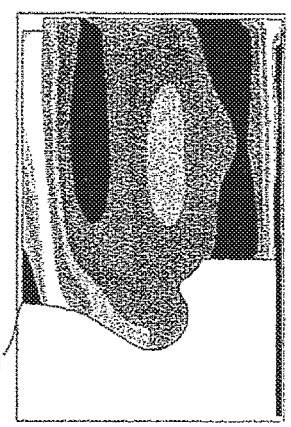
Figure 7D:
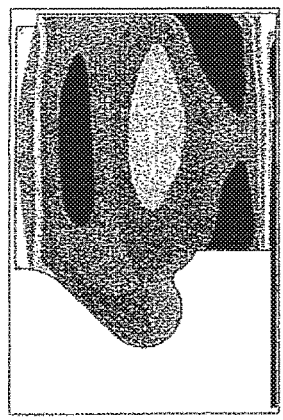
Figure 7E:
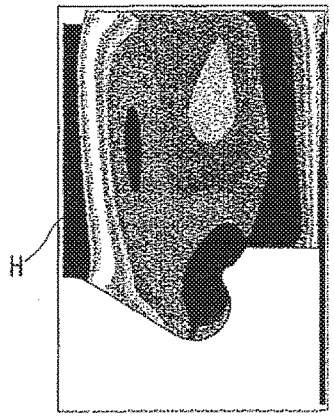
Figure 8:
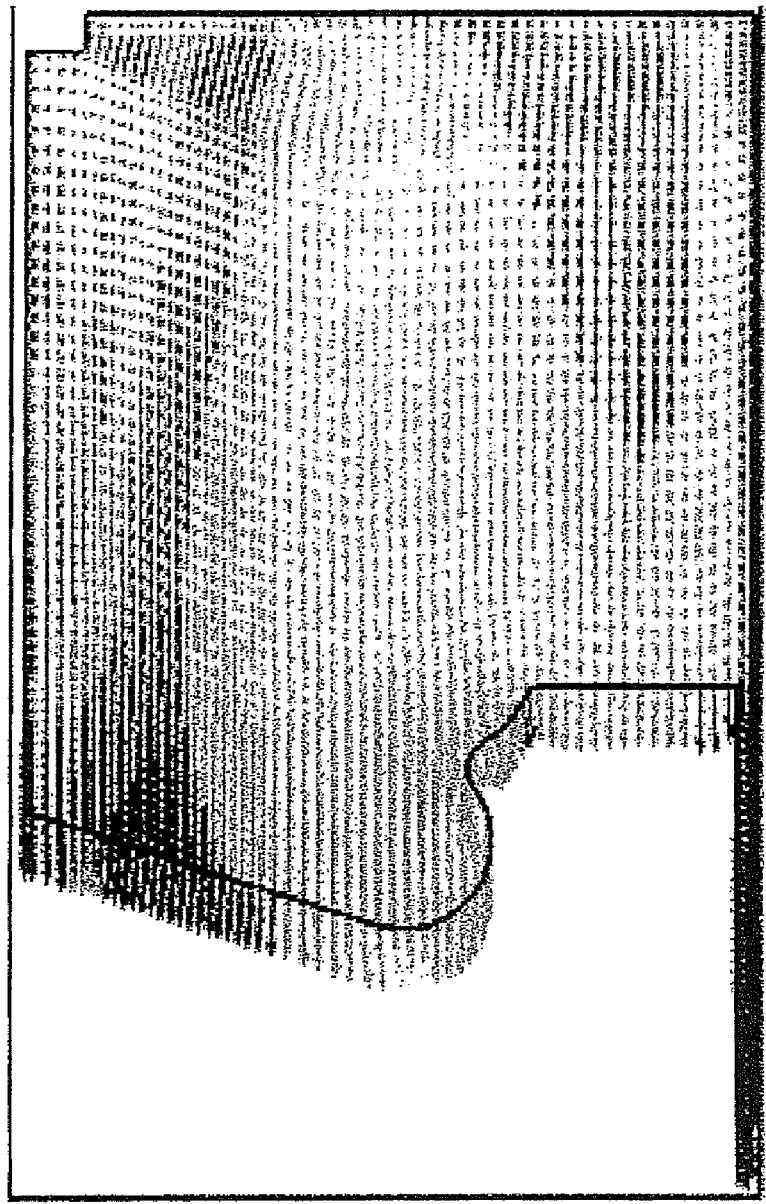
FIG. 8 is a characteristic view showing the incylinder turbulent energy in the comparison example 1.

FIG. 6 is a characteristic view showing variation of the quantity of soot during cycle in the practical example and comparative examples 1~4. After soot is produced during the diffusion combustion, the soot is partially decreased by oxidation reaction and the remaining soot is finally discharged from the combustion chamber. As shown in the figure, the combustion chamber structure of the practical example suppresses the generation of soot itself, moreover decreases the soot greatly by oxidation reaction, and minimize the emission quantity of soot finally discharged, as compared to the comparative examples 1~4.

FIG. 7 shows the distribution of the equivalent ratio or excess air ratio in the cylinder at a crank angle (430° CA) during the process of the above-mentioned oxidation reaction. In FIG. 7, (a)~(d) show the characteristics of the comparative examples 1~4, and (e) shows the characteristic of the practical example. In the practical examples shown in FIG. 7(e), the region of the highest excess air ratio (indicated by H) extends widely along the center line of raised portion 41. By contrast, the high excess air ratio region H is small in the comparative examples 1~3 shown in FIGS. 7(a)~7(c) and the high excess air ratio region H is not generated practically in the comparative examples 4 shown in FIG. 7(d). In the practical example, the oxidation reaction proceeds by utilizing the air in the central region, and decreases the soot.

Figure 9:
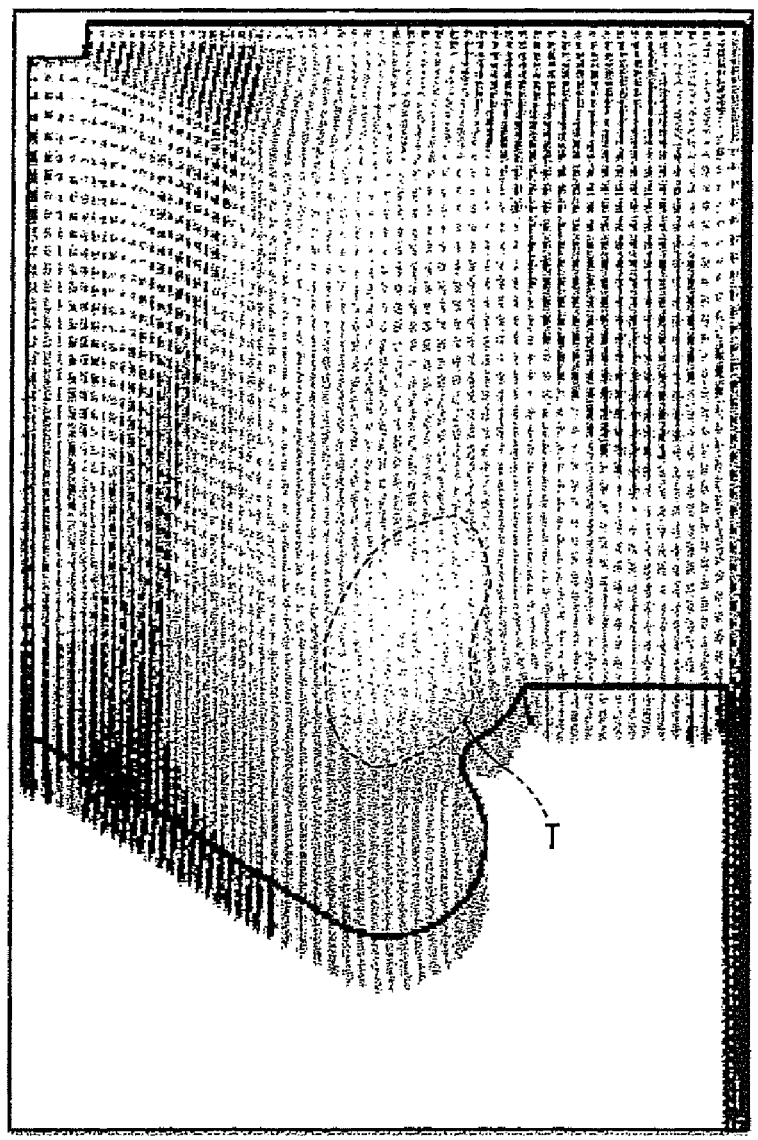
FIG. 9 is a characteristic view showing the incylinder turbulent energy in the comparison example 2.
Figure 10:
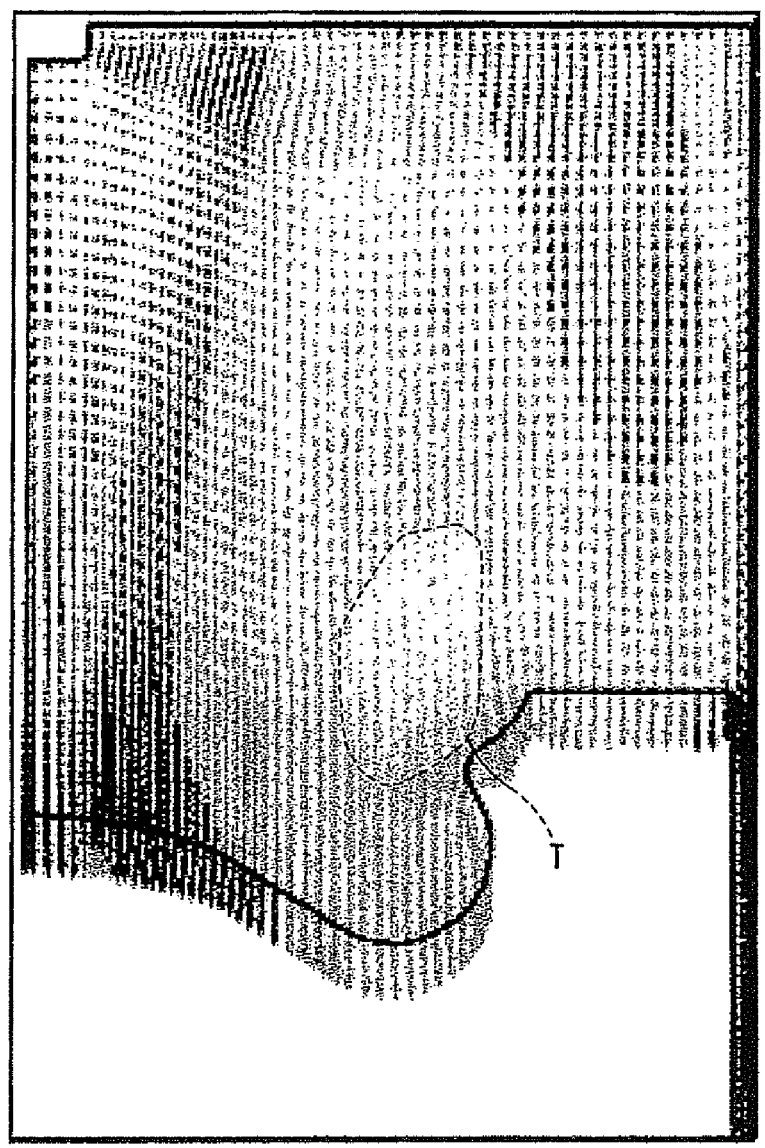
FIG. 10 is a characteristic view showing the incylinder turbulent energy in the comparison example 3.
Figure 11:
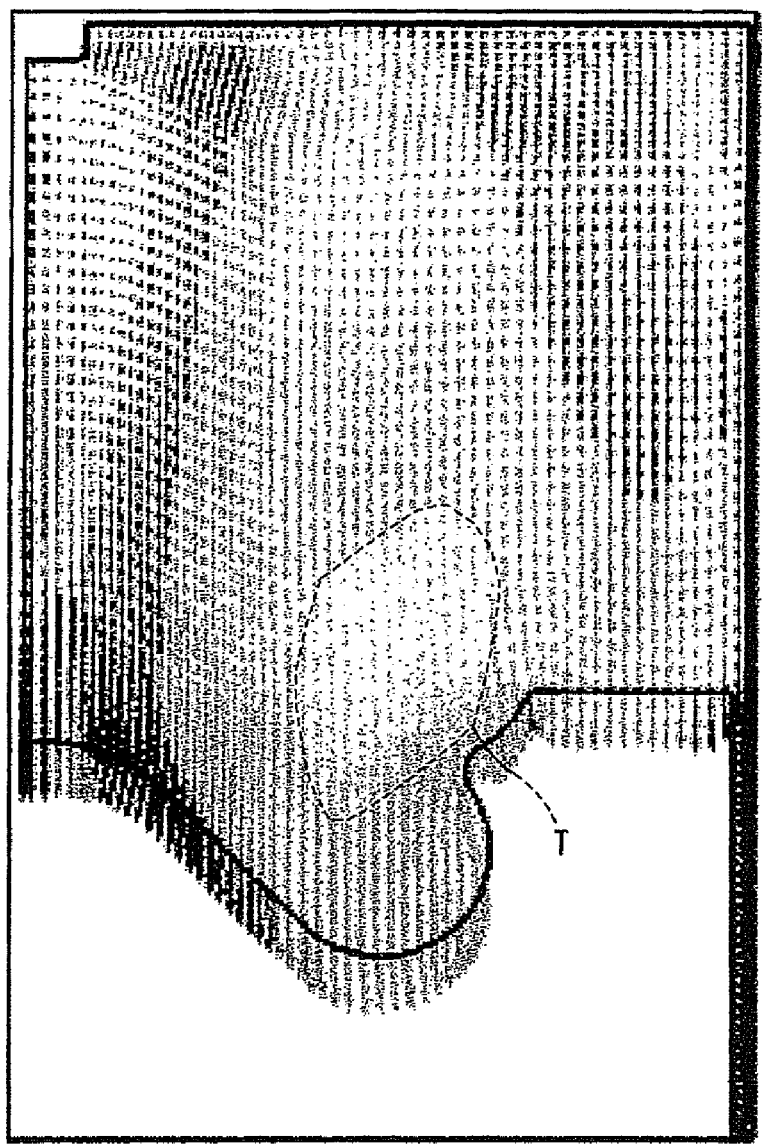
FIG. 11 is a characteristic view showing the incylinder turbulent energy in the comparison example 4.
Figure 12:
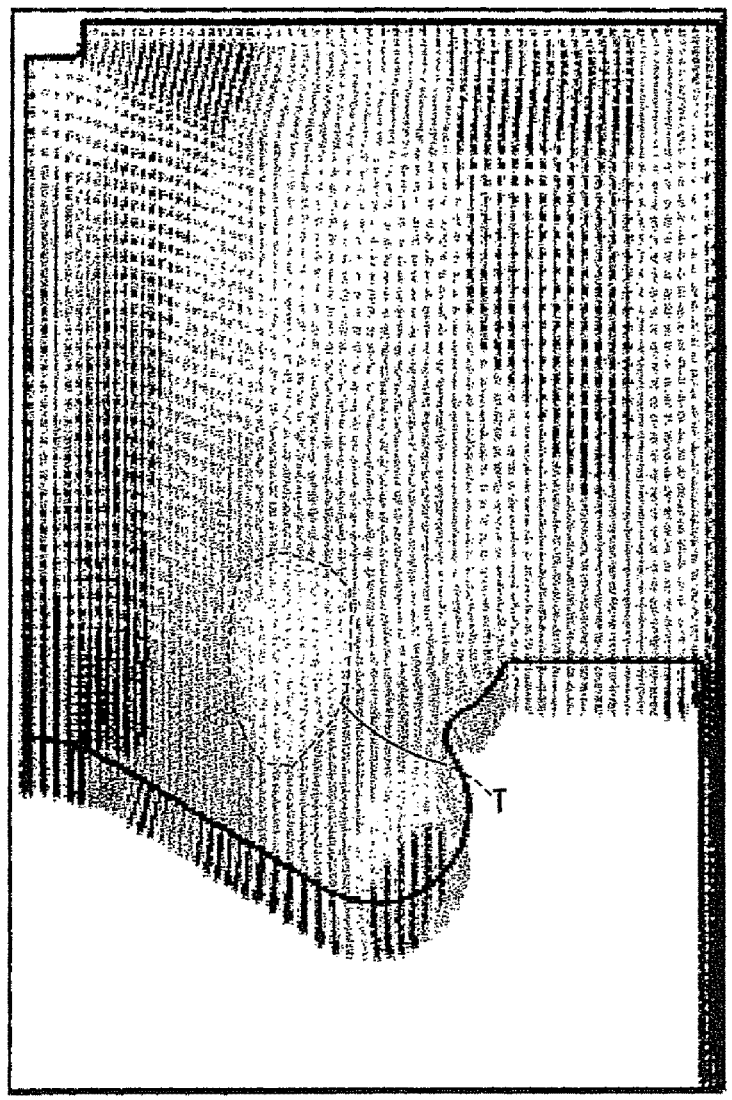
FIG. 12 is a characteristic view showing the incylinder turbulent energy in the practical example of the embodiment.

FIGS. 8~12 show the incylinder turbulent energy at the same crank angle of 430° CA. FIGS. 8~11 shows the characteristics of the comparative examples 1~4, respectively, and FIG. 12 shows the characteristic of the practical example. A region T is a great turbulent energy region in which the turbulent energy is greatest. In the comparative example 1 shown in FIG. 8, the great turbulent energy region T does not appear. In the comparative examples 2~4 as shown in FIGS. 9~11, the great turbulent energy region T appears near and over the outer periphery of cavity 6. In the practical example as shown in FIG. 12, the great turbulent energy region T is produced at a position closer to the center of cavity 6. Therefore, it is considered that the oxidation is promoted by the enhancement of mixing near the center of cavity 6.

Figure 13:
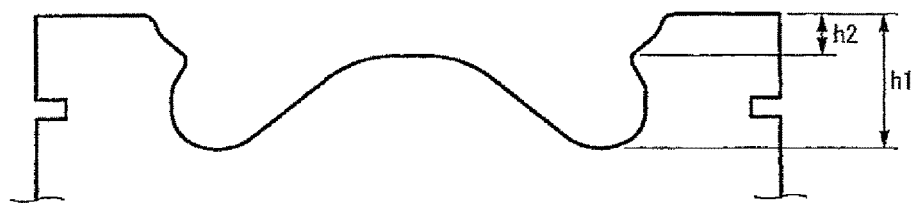
FIG. 13 is a view for illustrating dimensions of the cavity.

As to the height position (the position in the piston axial direction) of lip portion 42 corresponding to the "depth Z2" of raised portion 41, as shown in FIG. 13, a distance h2 from piston crown surface 43 to lip portion 42 in the piston axial direction is preferably greater than or equal to 10 percent and smaller than or equal to 37 percent with respect to a height h1 from the piston crown surface 43 to the bottom of cavity 6.

FIG. 14 shows the relationship between the ratio (h2/h1) of the above-mentioned heights and the soot emission quantity, obtained from the results of actual measurement in various engines. As shown in the figure, the soot emission becomes worse when the height ratio (h2/h1) is outside the range from 10 percent to 37 percent.

FIG. 15 shows the positional relationship between the cavity 6 of the practical example and the fuel spray from fuel injection nozzle 7. A fuel spray center axial line F extending from the spray point FP of fuel injection nozzle 7 points to a position slightly below the lip portion 42.

FIG. 16 shows a variation example in which the raised portion 41 is in the form of a frustum of cone or truncated cone having the top surface 41b which is made flat. The "slope reach depth Z1" and "depth Z2" are equal to those of the above-mentioned practical example.

FIG. 17 shows a variation example in which the conical surface 41a having the predetermined "slope reach depth Z1" is formed only in the upper half of raised portion 41. A lower part of raised portion 41 is formed to have a steeper slanting surface. However, the gas directed to a central portion of cavity 6 is guided along the conical surface 41a eventually, so that it is possible to obtain operations and effects similar to those of the above-mentioned practical example.

Figure 18:
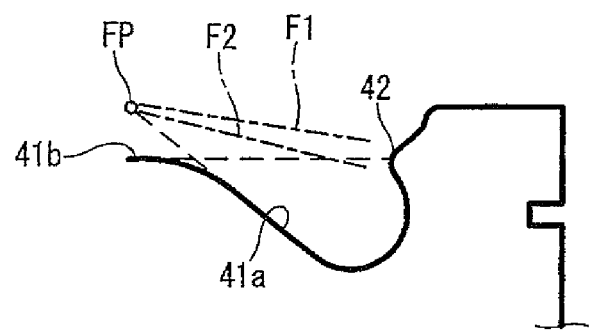
FIG. 18 is an illustration view showing a variation example having two injection hole groups.
Figure 19:
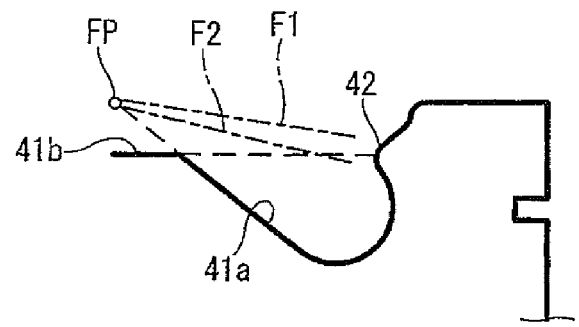
FIG. 19 is an illustration view showing another variation example having two injection hole groups.

FIGS. 18 and 19 show variation examples in which the fuel injection nozzle 7 is constructed to inject fuel at upper and lower tiers. In the examples of FIGS. 15 and 16, the nozzle holes or injection holes of fuel injection nozzle 7 are oriented to spray the fuel toward the same height position (the position in the cylinder axial direction). In the examples of FIGS. 18 and 19, by contrast, the fuel injection nozzle 7 includes a group of first nozzle holes so directed that a fuel spray center axial line F1 points to a relatively high position, and a group of second nozzle holes so directed that a fuel spray center axial line F2 points to a relatively low position. The first nozzle hole group and the second nozzle hole group are differentiated in the inclination angle (so-called umbrella angle) with respect to the cylinder center axial line. Both of the upper fuel spray center axial line F1 and lower fuel spray center line F2 extend from a common spray point FP as a starting point. The fuel spray center axial line F1 of the first injection hole group points to a position slightly above lip portion 42, and the fuel spray center axial line F2 of the second injection hole group points to a position slightly below lip portion 42. The raised portion 41 shown in FIG. 18 has the same configuration as that of FIG. 15, and the raised portion 41 shown in FIG. 19 has the same configuration as that of FIG. 16.

The invention claimed is:

1. A combustion chamber structure in a diesel engine including a piston having a crown surface formed with a reentrant cavity, and a multi-hole fuel injection nozzle disposed on a center line of the cavity, wherein
    a lip portion defining a minimum diameter in an entrance portion of the cavity is located below an opening brim,
    a spray center axial line extending from a spray point of the fuel injection nozzle is oriented to point to a position slightly below the lip portion at a position at or near a top dead center,
    a height position of a top of a raised portion formed centrally in a bottom of the cavity is set substantially equal to a height position of the lip portion, and
    a conical surface of the raised portion is formed at one of an angle pointing to the spray point of the fuel injection nozzle at a piston position at the top dead center, and an angle steeper than the angle pointing to the spray point, to form a region where an excess air rate is highest, on a center line of the raised portion.

2. The combustion chamber structure as claimed in claim 1, wherein the conical surface is inclined to have the angle pointing to the spray point of the fuel injection nozzle at the piston position of the top dead center.

3. The combustion chamber structure as claimed in claim 1, wherein a distance from the crown surface of the piston to the lip portion in an axial direction of the piston is greater than or equal to 10 percent and smaller than or equal to 37 percent with respect to a distance from the crown surface of the piston to the bottom of the cavity.

4. The combustion chamber structure as claimed in claim 1, wherein the fuel injection nozzle includes a first injection hole group pointing to a lower level and a second injection hole group pointing to a higher level higher than the lower level, and
    a spray center axial line of the first injection hole group extending from the spray point points to a position below the lip portion at a position at or near the top dead center, and a spray center axial line of the second injection hole group points to a position above the lip portion.

* * * * *